(12) United States Patent
Radcliffe et al.

(10) Patent No.: US 9,805,021 B2
(45) Date of Patent: Oct. 31, 2017

(54) NUTRIENT CONTENT IDENTIFICATION METHOD AND APPARATUS

(71) Applicant: Under Armour, Inc., Baltimore, MD (US)

(72) Inventors: Paul Radcliffe, San Francisco, CA (US); Karlo Berket, San Francisco, CA (US); Chul Lee, Mountain View, CA (US); Jiang Xu, Sunnyvale, CA (US); Bryan Levine, Oakland, CA (US); Karthik Subramaniam, San Francisco, CA (US); Mark Allen, San Francisco, CA (US)

(73) Assignee: Under Armour, Inc., Baltimore, MD (US)

( * ) Notice: Subject to any disclaimer, the term of this patent is extended or adjusted under 35 U.S.C. 154(b) by 62 days.

(21) Appl. No.: 14/805,778

(22) Filed: Jul. 22, 2015

(65) Prior Publication Data

US 2016/0188563 A1  Jun. 30, 2016

Related U.S. Application Data (60) Provisional application No. 62/028,218, filed on Jul. 23, 2014.

(51) Int. Cl.
| | | |
|---|---|---|
| *G10L 15/00* | (2013.01) | |
| *G10L 15/06* | (2013.01) | |
| *G06F 17/27* | (2006.01) | |

(52) U.S. Cl.
CPC .............................. *G06F 17/2705* (2013.01)

(58) Field of Classification Search
None
See application file for complete search history.

(56) References Cited

U.S. PATENT DOCUMENTS

| | | | | |
|---|---|---|---|---|
| 6,478,736 | B1* | 11/2002 | Mault | A61B 5/044 |
| | | | | 128/921 |
| 2006/0074716 | A1* | 4/2006 | Tilles | G06Q 30/02 |
| | | | | 705/2 |
| 2009/0099873 | A1* | 4/2009 | Kurple | G06Q 50/24 |
| | | | | 705/3 |
| 2009/0131089 | A1* | 5/2009 | Micali | H04L 67/04 |
| | | | | 455/466 |
| 2009/0275002 | A1* | 11/2009 | Hoggle | G09B 19/0092 |
| | | | | 434/127 |

(Continued)

*Primary Examiner* — Satwant Singh (57) ABSTRACT

Techniques are provided for calculating nutrient content information. A server that hosts a fitness management application receives text information that describes food recipe information. The server parses the text information to identify relevant food information. The relevant food information includes a first text portion that corresponds to food ingredient information and a second text portion that corresponds to food quantity information. The server matches the food ingredient information to the first text portion with a known food ingredient in a database of food ingredient information. The server converts the food quantity information in the second text portion to a known food quantity type. The server calculates nutrient content information of the food ingredient information using nutritional information of the known food ingredient and the known food quantity type.

20 Claims, 6 Drawing Sheets

(56) References Cited

U.S. PATENT DOCUMENTS

| | | | |
|---|---|---|---|
| 2012/0005222 A1* | 1/2012 | Bhagwan | G06F 17/30389 707/769 |
| 2012/0096087 A1* | 4/2012 | Curcelli | G06Q 10/101 709/204 |
| 2012/0136731 A1* | 5/2012 | Kidron | G06Q 50/10 705/15 |
| 2014/0377725 A1* | 12/2014 | Kidron | G06F 19/322 434/127 |
| 2015/0242468 A1* | 8/2015 | Shoemaker | G06F 17/277 707/755 |
| 2015/0339394 A1* | 11/2015 | Jinq | G09B 19/00 715/776 |
| 2016/0071431 A1* | 3/2016 | Jain | G06F 17/30312 434/127 |
| 2016/0103910 A1* | 4/2016 | Kim | G06F 19/30 707/738 |
| 2016/0188712 A1* | 6/2016 | Radcliffe | G06F 17/277 704/245 |

* cited by examiner

Figure 1

| all_unit_conversions | |
|---|---|
| quantity_1 | int |
| unit_1 | varchar |
| quantity_2 | int |
| unit_2 | varchar |

| selected_ingredients | |
|---|---|
| user | varchar |
| original_text | varchar |
| selected_food | varchar |
| selected_weight | varchar |
| selected_quantity | int |

| learned_conversions | |
|---|---|
| selected_food | varchar |
| selected_weight | varchar |
| selected_quantity | int |
| matched_food | varchar |
| matched_weight | varchar |
| matched_quantity | int |
| number_selected | int |
| first_seen | date |
| last_seen | date |

NUTRIENT CONTENT IDENTIFICATION METHOD AND APPARATUS

RELATED APPLICATIONS

This application claims priority from U.S. Provisional Patent Application No. 62/028,218 filed on Jul. 23, 2014, the entirety of which is incorporated by reference herein.

TECHNICAL FIELD

The present disclosure relates to the field of data processing. More particularly, the present disclosure relates to recipe detail identification method and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Currently if an individual would like to discover the nutritional contents from an ingredient line in a recipe, they would have to first retrieve the nutritional contents for a suggested serving of that food item, and then either calculate or guess the corresponding quantity as specified in the recipe. The undertaking could be difficult in many cases, especially when ingredient quantities are vague, e.g., one apple, or missing entirely, e.g., in the case of cooking spray.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Techniques are provided for calculating nutrient content information. A server that hosts a fitness management application receives text information that describes food recipe information. The server parses the text information to identify relevant food information. The relevant food information includes a first text portion that corresponds to food ingredient information and a second text portion that corresponds to food quantity information. The server matches the food ingredient information to the first text portion with a known food ingredient in a database of food ingredient information. The server converts the food quantity information in the second text portion to a known food quantity type. The server calculates nutrient content information of the food ingredient information using nutritional information of the known food ingredient and the known food quantity type.

Example Embodiments

Disclosed embodiments include apparatus, method and storage medium associated with fitness management application in general, and recipe detail identification in particular.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
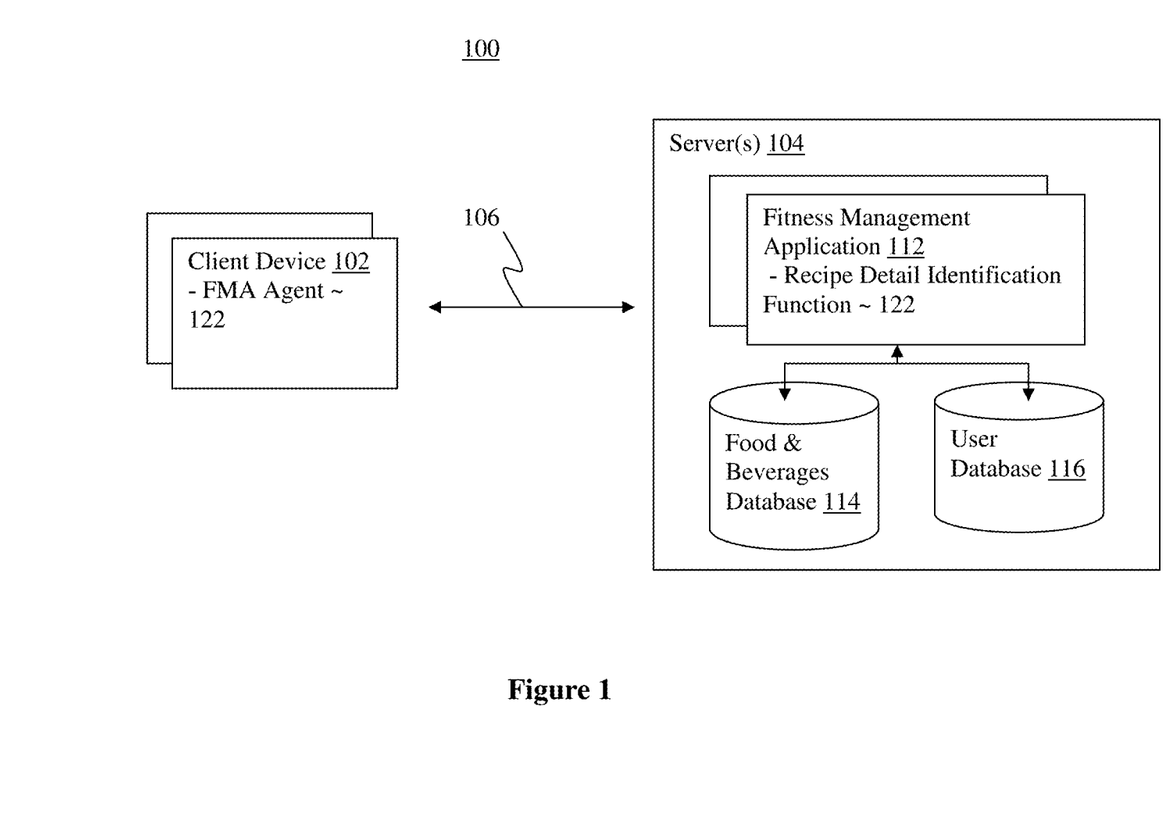
FIG. 1 illustrates a fitness management system suitable for practicing the present disclosure, according to the various embodiments.

Referring now to FIG. 1, wherein a fitness management system, according to the various embodiments, is illustrated. As shown, fitness management system (FMS) 100 may include client devices 102 and one or more servers 104 coupled with each other. Server(s) 104 may host a fitness management application (FMA) 112, including a number of databases, e.g., food and beverages database 114 and user database 116, configured in accordance to the teachings of the present disclosure. Whereas each client device 102 may include a client side agent 122 of FMA 112 configured to access and interact with FMA 112, to enable a user of the client device 102, among other things, to develop a fitness plan that may include a food and beverage budget, and monitor the progress towards meeting the plan, to be described more fully below.

Figure 3:
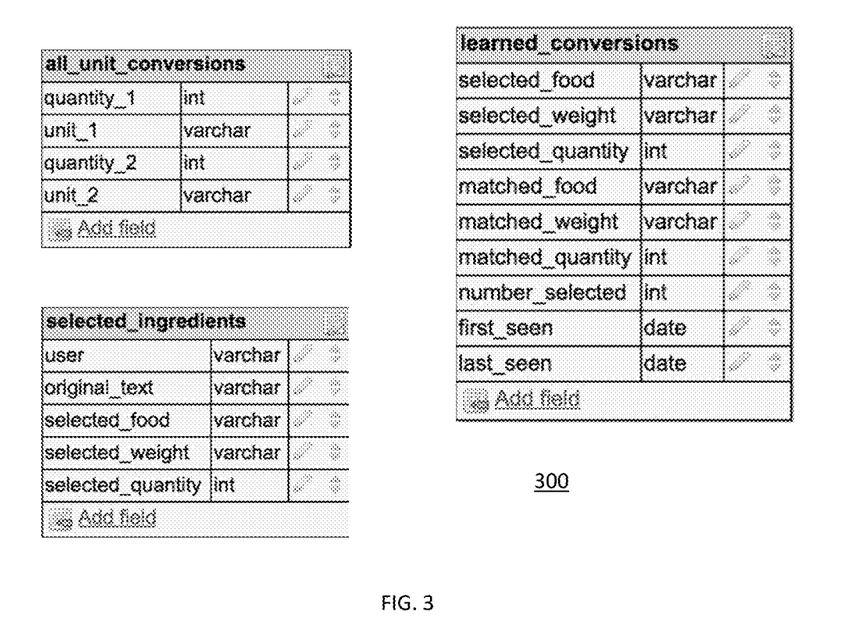
FIG. 3 illustrates a number of example tables of the food and beverage database of FIG. 1, according to various embodiments.

In embodiments, servers 104, except for FMA 112 and databases 114-116, may be any one of a number of computer servers known in the art, including but are not limited to servers available from Dell Computing of Austin, Tex. or Hewlett Packard of Palo Alto, Calif. In embodiments, FMA 112 may include recipe detail identification function 122 configured to provide nutritional information about recipe ingredients. Recipe detail identification function 122 may further include logic for converting between different units of measures, e.g., between a cup and fluid oz, between fluid oz and milliliters, and so forth. Recipe detail identification function 122 may also be configured to respond to an inquiry from a client device, as well as a call from other components of FMA 112. In embodiments, food & beverages database 114 may include recipes and ingredient items, as well as food and beverage items, including nutrient information for various units of measures. Examples of nutrient information may include, but is not limited to, amount of sodium, carbohydrates, calcium, various vitamins and calories per serving size of various units of measures. Additionally database 114 may also include a unit of measure and/or quantity substitution table with entries containing unit of measure and/or quantity substitutions. A number of example tables 300 of the F&B database 114, including a unit of measure conversion table, are shown in FIG. 3.

In embodiments, client devices 102 may be any one of a number of stationary or portable electronic devices known in the art, including but are not limited to, desktop computers available from Dell Computing of Austin, Tex., or smartphones, computing tablets, lapstop computers, electronic readers, personal digital assistants, and so forth, such as Galaxy S4 from Samsung Electronics of Seoul, Korea, or iPad from Apple Computer of Cupertino, Calif. In embodiments, one or more portable computing devices 102 may be a wearable computing device, e.g., a smart watch, a smart eyeglasses, and so forth. In embodiments, FMA agent 122 may be a generic browser, such as Internet Explorer, available from Microsoft Corp., of Redmond, Wash., or Safari from Apple Computer of Cupertino, Calif., e.g., in cases where client devices 102 are desktop or tablet computers. In other embodiments, FMA agent 122 may be a client side application, e.g., in cases where client devices 102 are personal digital assistants or smartphones.

In embodiments, client devices 102 and server(s) 104 may be communicatively coupled with one another via communication links 106 over one or more wired and/or wireless, private and/or public networks, including the Internet. Each of client devices 102 and server(s) 104 may be configured with the appropriate networking communication interfaces. An example of wired communication interface may include but is not limited Ethernet, while examples of wireless communication interfaces may include but are not limited to near field communication (NFC), Bluetooth, WiFi, 4G or 5G LTE. In between the communication interfaces of client devices 102 and server(s) 104 may be any number of gateways, routers, switches, based stations, and so forth.

Figure 2:
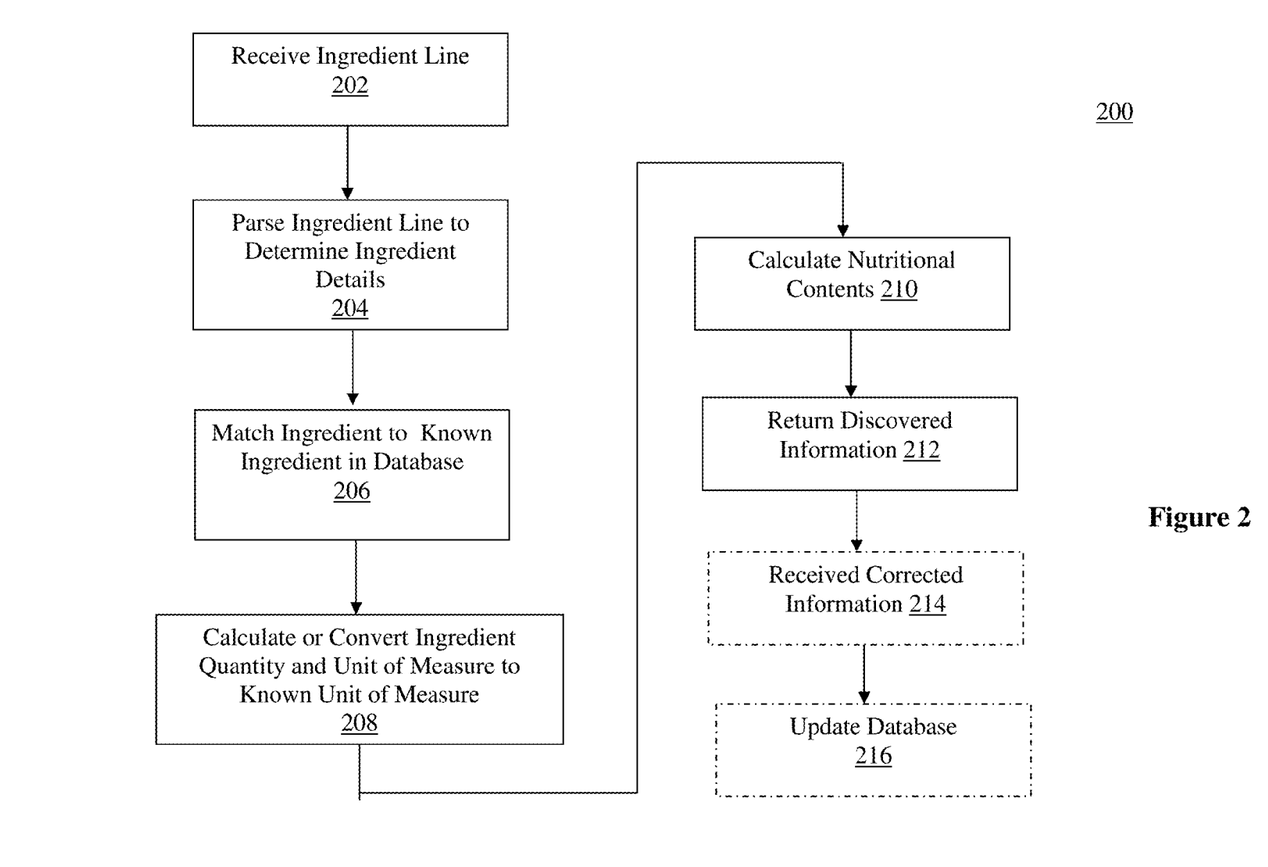
FIG. 2 illustrates an example operation flow of the recipe detail identification of FIG. 1 in further details, according to the various embodiments.

Referring now FIG. 2, wherein a method for recipe detail identification, in accordance with various embodiments, is shown. As illustrated, method 200 for recipe detail identification may include operations performed in blocks 202-216. The operations may be performed, e.g., by earlier described recipe detail identification function 122 of FMA 112 of FIG. 1.

At block 202, an ingredient line in raw text may be received. The raw text may also be described herein as text information that describes a food recipe. On receipt, from block 202, process 200 may proceed to block 204.

At block 204, the text information of ingredient line may be parsed for ingredient names, ingredient quantities, ingredient units of measures, as well as any other relevant information included in the ingredient line. Examples of other relevant information may include, but are not limited to, ingredient alternatives, unit of measure alternatives, preparation modifiers, notes, and so forth. In one example, the text information of the ingredient line may have multiple portions of relevant information. For example, the text information of the ingredient line may have a first text portion that corresponds to food ingredient information and a second text portion that corresponds a food quantity information. Once the ingredient line has been parsed, from block 204, process 200 may proceed to block 206.

At block 206, using the obtained information, an attempt is made to match the determined ingredient (e.g., the food ingredient information) to known ingredient in the database. In embodiments, the matching may be performed through a cascading matching system that conducts a cascading series of searches ordered by confidence accuracy. The cascading matching system may be multi-level and parallelized, including levels, such as: "Does this ingredient match the description of another ingredient previously selected for this particular recipe in the database," "Does this ingredient match the description of another ingredient previously selected in the database," or "Does this ingredient match the description of another ingredient in the database." In embodiments, the levels of cascading may be rearranged, added, or removed depending on the structure of the ingredient being analyzed. Once the ingredient has been matched, from block 206, process 200 may proceed to block 208.

At block 208, the quantity and unit of measure of the parsed ingredient item (e.g., the food quantity information) may be converted to the quantity and unit of measure of the matched ingredient (e.g., a known food quantity type). If the parsed unit of measure of the parsed ingredient is directly convertible to the known unit of measure (e.g., tablespoons, cups, and so forth, the quantity and unit of measure are mathematically converted. For example if the parsed unit of measure is 1 cup, and the matched ingredient has the measure of 1 tablespoon, the unit of measure for the parsed unit is mathematically calculated to 16 tablespoons. If the unit of measure is unknown or cannot be mathematically converted, substitution units of measure and quantity are looked up and retrieved from the unit substitution table. For example, if the parsed unit of measure is 1 cup, and the unit substitution table looks up the ingredient description and finds an entry that dictates 1 tablespoon converts to 2 ounces, then the unit of measure for the parsed ingredient is converted to 32 ounces. This conversion is done by first converting the parsed unit of measure from 1 cup to 16 tablespoons, then by converting the 16 tablespoons to 32 ounces (1 tablespoon=2 ounces) On conversion, from block 208, process 200 may proceed to block 210.

At From block 210, nutrient contents for the ingredient line may be calculated, using the matched ingredients, calculated units of measure and/or quantities. For a given quantity of an individual food, the amount of each nutritional content is known. Taking the conversion from process 200 we can use that conversion rate to recalculate the nutritional content. For example, food A has 100 calories per 100 grams. The calculation from process 200 tells us that we have 32 ounces of food A. We also can determine based on known weight conversions that 1 ounce=10 grams. We will then calculate that 32 ounces of food A is equal to 320 grams. 320 grams at 100 calories per 100 grams equals 320 calories. On calculation, process 200 may proceed to block 212.

At block 212, the resulting detail information in terms of matched ingredients, converted or substituted unit of measures and quantities are returned to the caller. On return, from block 212, the process may end if the caller is another component of FMA 112, or process 200 may optionally proceed to block 214, if the caller is a client device.

At optional block 214, recipe detail identification function may receive another call from the client device with any correction to the information returned. On receipt, from block 214, process 200 may proceed to block 216.

Awe ct block 216, using the correction information, the cascading matching system, and/or the unit substitution table may be updated. For example, if a user corrects a match of 1 lb to equal 8 ounces. We will store the correction in any applicable database. This information will be presented to future users through the matching system and as a possible unit substitution. When the conversion is confirmed by a later user, it will then be added as a possible match to the cascading matching system. On update, from block 216, process 200 may end.

Figure 4:
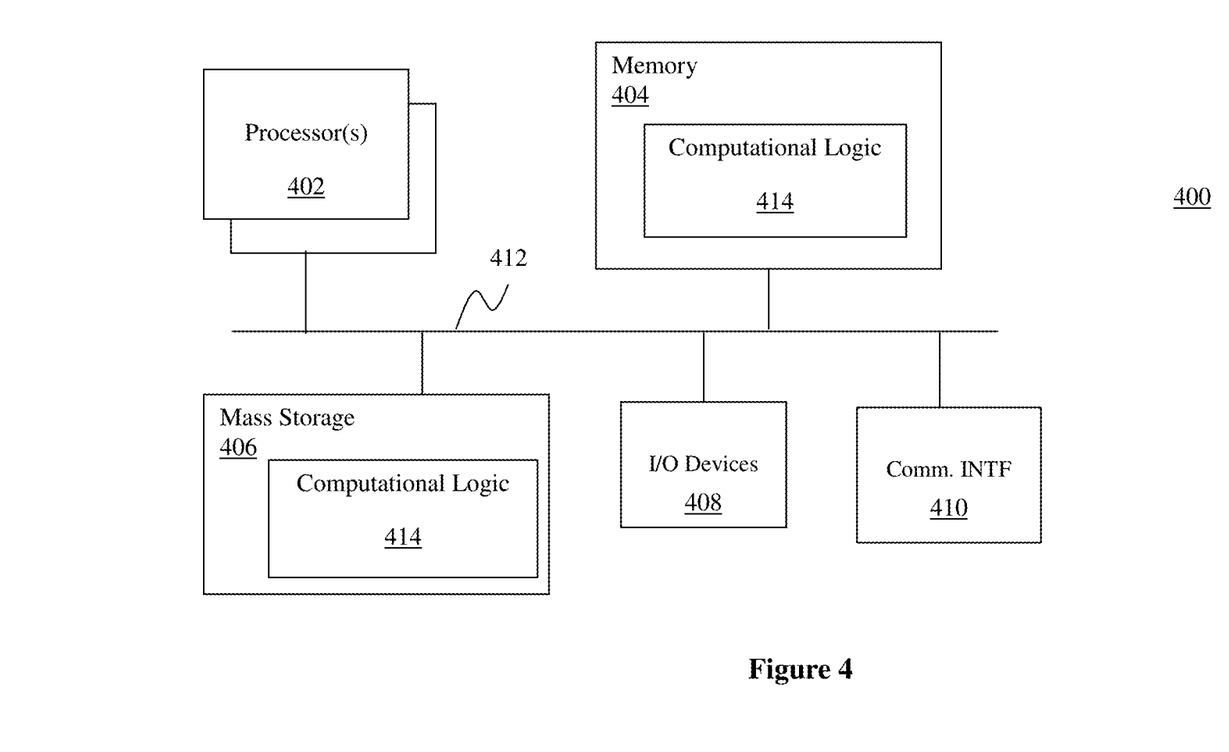
FIG. 4 illustrates an example computing system suitable for use as a fitness management server or a client device, according to various embodiments.

Referring now to FIG. 4, wherein an example computer suitable for use as computing device 114 or portable client device 104 of FIG. 1, in accordance with various embodiments, is illustrated. As shown, computer 400 may include one or more processors or processor cores 402, and system memory 404. For the purpose of this application, including the claims, the terms "processor" and "processor cores" may be considered synonymous, unless the context clearly requires otherwise. Additionally, computer 400 may include mass storage devices 406 (such as diskette, hard drive, compact disc read only memory (CD-ROM) and so forth), input/output devices 408 (such as display, keyboard, cursor control and so forth) and communication interfaces 410 (such as network interface cards, modems and so forth). The elements may be coupled to each other via system bus 412, which may represent one or more buses. In the case of multiple buses, they may be bridged by one or more bus bridges (not shown).

Each of these elements may perform its conventional functions known in the art. In particular, when used as computing device 114, system memory 404 and mass storage devices 406 may be employed to store a working copy and a permanent copy of the programming instructions implementing the operations associated with recipe detail identification function 122 earlier described, shown as computational logic 422. The various elements may be implemented by assembler instructions supported by processor(s) 402 or high-level languages, such as, for example, C, that can be compiled into such instructions.

The permanent copy of the programming instructions may be placed into permanent storage devices 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The number, capability and/or capacity of these elements 410-412 may vary, depending on whether computer 400 is used as computing device 114 or portable client device 104. When used as portable client device 104, computing device 400 may be a smartphone, computing tablet, ereader, ultrabook or laptop. Otherwise, the constitutions of elements 410-412 are known, and accordingly will not be further described.

Figure 5:
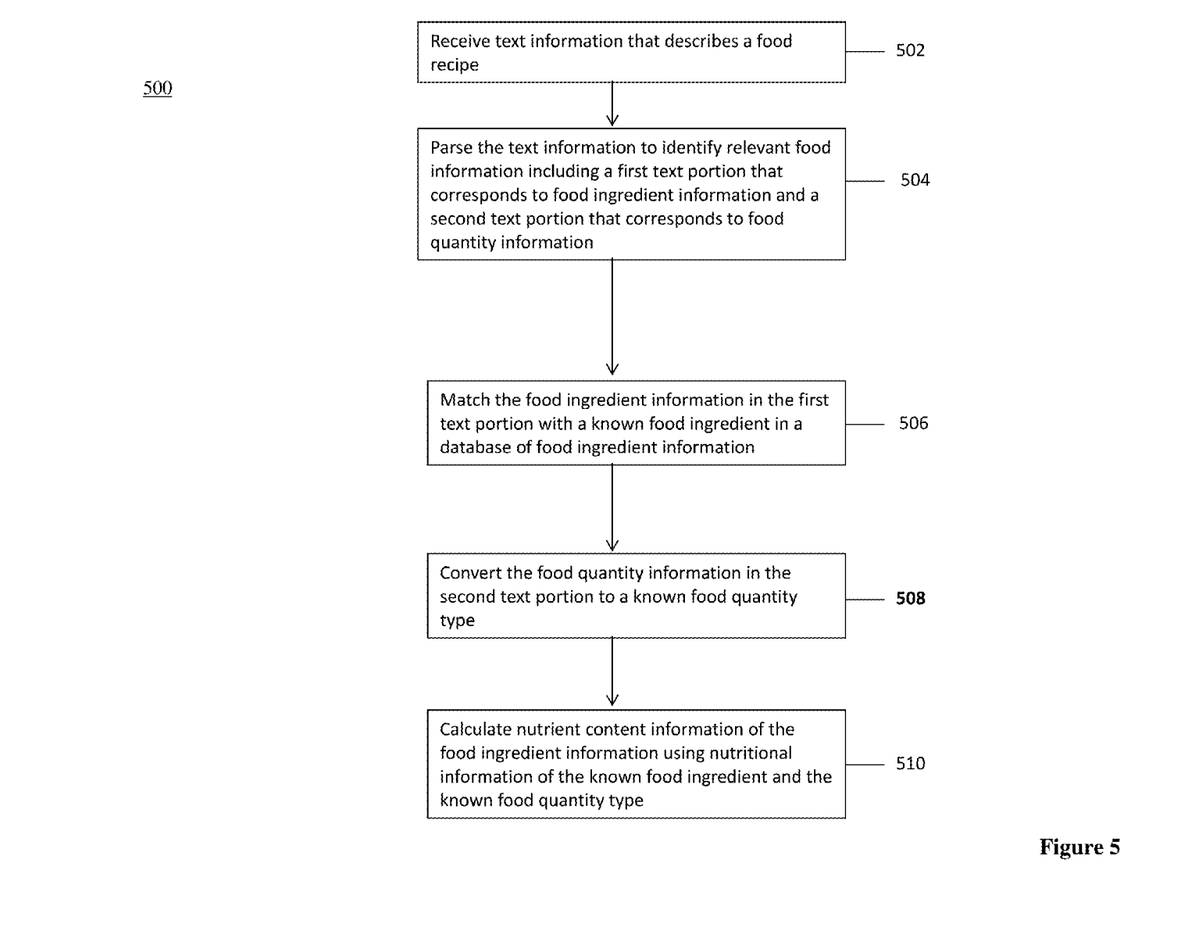
FIG. 5 shows an example flow chart depicting operations for determining nutrition information of recipes.

FIG. 5 shows an example flow chart 500 depicting operations performed by the server 104 to determine nutritional information of recipes. At 502, the server 102 receives text information that describes a food recipe. The server 102, at 504, parses the text information to identify relevant food information including a first text portion that corresponds to food ingredient information and a second text portion that corresponds to food quantity information. At 506, the server 102 matches the food ingredient information in the first text portion with a known food ingredient in a database of food ingredient information. The server 102, at 508, converts the food quantity information in the second text portion to a known food quantity type. At operation 510, the server 102 calculates nutrient content information of the food ingredient information using nutritional information of the known food ingredient and the known food quantity type.

Figure 6:
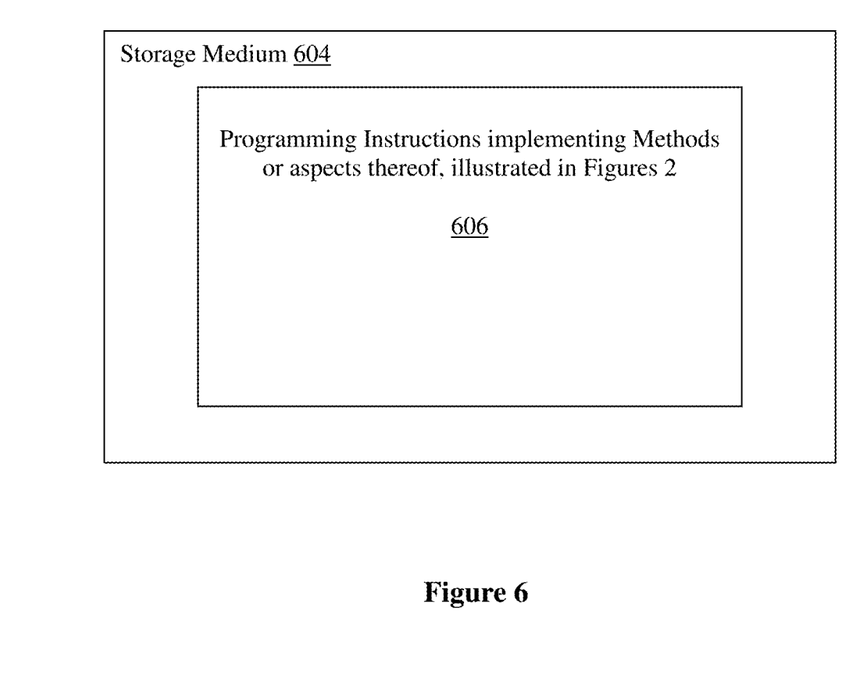
FIG. 6 illustrates an example storage medium having instructions to cause a computing device to practice aspects of the fitness management application, recipe detail identification function in particular, according to various embodiments.

FIG. 6 illustrates an example computer-readable non-transitory storage medium having instructions configured to practice all or selected ones of the operations associated with earlier described recipe detail identification function 122, in accordance with various embodiments. As illustrated, non-transitory computer-readable storage medium 602 may include a number of programming instructions 604. Programming instructions 604 may be configured to enable a device, e.g., computer 400, in response to execution of the programming instructions, to perform, e.g., various operations of process 200 of FIG. 2, e.g., but not limited to, the operations associated with recipe detail identification function 122. In alternate embodiments, programming instructions 604 may be disposed on multiple computer-readable non-transitory storage media 602 instead. In alternate embodiments, programming instructions 604 may be disposed on computer-readable transitory storage media 602, such as, signals.

In summary, a method is provided comprising: at a server device that hosts a fitness management application, receiving text information that describes a food recipe; at the server, parsing the text information to identify relevant food information including a first text portion that corresponds to food ingredient information and a second text portion that corresponds to food quantity information; at the server, matching the food ingredient information in the first text portion with a known food ingredient in a database of food ingredient information; at the server, converting the food quantity information in the second text portion to a known food quantity type; and at the server, calculating nutrient content information of the food ingredient information using nutritional information of the known food ingredient and the known food quantity type.

In addition, an apparatus is provided comprising: a communication unit; a memory; and a processor coupled to the communication unit and the memory and configured to: receive, via the communication unit, text information that describes a food recipe; parse the text information to identify relevant food information including a first text portion that corresponds to food ingredient information and a second text portion that corresponds to food quantity information; match the food ingredient information in the first text portion with a known food ingredient in a database of food ingredient information; convert the food quantity information in the second text portion to a known food quantity type; and calculate nutrient content information of the food ingredient information using nutritional information of the known food ingredient and the known food quantity type.

Furthermore, a computer-readable, non-transitory storage medium is provided that has computer executable instructions and when the instructions are executed, the instructions are operable to: receive text information that describes a food recipe; parse the text information to identify relevant food information including a first text portion that corresponds to food ingredient information and a second text portion that corresponds to food quantity information; match the food ingredient information in the first text portion with a known food ingredient in a database of food ingredient information; convert the food quantity information in the second text portion to a known food quantity type; and calculate nutrient content information of the food ingredient information using nutritional information of the known food ingredient and the known food quantity type.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method comprising:
    at a server device that hosts a fitness management application, receiving text information that describes a food recipe;
    at the server, parsing the text information to identify a first text portion that corresponds to one or more food ingredients and a second text portion that corresponds to a quantity corresponding to each of the one or more food ingredients;
    at the server, matching the one or more food ingredients in the first text portion with respective ones of known food ingredients in a database of known food ingredients;
    at the server, converting the quantity corresponding to each of the one or more food ingredients in the second text portion from a first quantity unit to a second quantity unit, the second quantity unit being selected based at least in part on a unit associated to nutrition information for the one or more food ingredients;
    at the server, calculating one or more nutrient content values of the food recipe using the nutritional information for the one or more food ingredients and the second quantity unit; and
    entering at least a portion of the calculated one or more nutrient content values into a nutrition log upon user selection thereof.

2. The method of claim 1, wherein the act of matching comprises matching the one or more food ingredients with the respective ones of the known food ingredients by performing a cascading series of searches in the database of known food ingredients, wherein the cascading series includes levels of comparisons of the one or more food ingredients with selected possibilities of matches in the database of known food ingredients.

3. The method of claim 2, further comprising ordering results of the cascading series of searches by a confidence accuracy.

4. The method of claim 2, further comprising rearranging, adding or removing the levels of comparisons based on the one or more food ingredients.

5. The method of claim 1, wherein the act of converting comprises converting from the first quantity unit to the second quantity unit via an intermediary quantity unit.

6. The method of claim 1, further comprising:
    sending the one or more nutrient content values to a client device;
    receiving corrective instructions from the client device, wherein the corrective instructions include instructions to modify particular ones of the one or more nutrient content values; and
    modifying particular ones of the one or more nutrient content values based on the corrective instructions.

7. The method of claim 1, wherein the database of known food ingredients comprises one or more lists of individual food items and respective nutritional information for each.

8. An apparatus comprising:
    a communication unit;
    a memory; and
    a processor coupled to the communication unit and the memory and comprising a plurality of instructions which are configured to when executed cause the apparatus to:
    receive, via the communication unit, text information that describes a food recipe, the recipe comprising at least a plurality of ingredients and a respective quantity of each, and one or more instructions to be performed with respect to the ingredients;
    parse the text information to identify relevant food information including a first text portion that corresponds to the plurality of ingredients and a second text portion that corresponds to the respective quantity information;
    identify a match between each of a plurality of ingredients in the first text portion and respective ones of known food ingredients in a database of known ingredients;
    for each of the plurality of ingredients of the first text portion, convert a quantity unit of the food quantity information associated thereto to a quantity unit associated with the known food ingredient information in the database;
    calculate nutrient content information of the recipe, the calculation comprising a determination of a sum of a plurality of products of a nutritional value for each of the plurality of the known ingredients and the known quantity associated therewith; and
    enable a user to indicate consumption of at least a portion of the recipe, the indication causing a respective at least portion of the calculated nutrient content information to be entered into a nutrition log.

9. The apparatus of claim 8, wherein the plurality of instructions which are further configured when executed cause the apparatus to identify the match between each of the plurality of ingredients and the known food ingredients via performance of a cascading series of searches of the plurality of ingredients in the database, wherein the cascading series includes levels of comparisons of the plurality of ingredients with selected possibilities of matches in the database.

10. The apparatus of claim 9, wherein results of the cascading series of searches are ordered according to a confidence accuracy.

11. The apparatus of claim 9, wherein plurality of instructions which are further configured when executed cause the apparatus to rearrange, add or remove the levels of comparison based on the plurality of ingredients.

12. The apparatus of claim 8, wherein plurality of instructions which are further configured when executed cause the apparatus to:
send, via the communication unit, the nutrient content information to a client device;
receive, via the communication unit, corrective instructions from the client device, wherein the corrective instructions include instructions to modify the nutrient content information; and
modify the nutrient content information based on the corrective instructions.

13. The apparatus of claim 8, wherein the apparatus comprises a client device in communication with one or more servers comprising said database.

14. The apparatus of claim 8, wherein the apparatus comprises a server apparatus and the user comprises a user of a client device in communication with the server apparatus and configured to run an application thereon to maintain the nutrition log.

15. A computer-readable, non-transitory storage medium having a plurality of computer executable instructions stored thereon which when executed are operable to:
receive a plurality of text that describes a recipe;
parse the plurality of text to identify a first text portion comprising a plurality of ingredients and a second text portion comprising quantity information relating to the plurality of ingredients in the first text portion;
match the plurality of ingredients in the first text portion to individual ones of a plurality of known ingredients in a database;
determine whether the quantity information relating to individual ones of the plurality of ingredients comprises a same quantity unit as a quantity unit of the known ingredient to which it is matched in the database;
when it is determined that the quantity unit of one or more of the plurality of ingredients is not the same, convert the quantity unit of the quantity information in the second text portion relating to the one or more of the plurality of ingredients to the quantity unit of the known ingredient in the database to which the one or more of the plurality of ingredients is matched;
calculate nutrient content information of the recipe using predetermined nutritional information associated to the known ingredients to which each of the plurality of ingredients is matched and the quantity thereof; and
enable a user to indicate consumption of at least a portion of the recipe, the indication causing a respective at least portion of the calculated nutrient content information to be entered into a nutrition log.

16. The computer-readable storage medium of claim 15, wherein the instructions when executed are operable to match comprise instructions operable to match the plurality of ingredients to individual ones of the plurality of known ingredients by performing a cascading series of searches of food ingredient information in the database, wherein the cascading series includes levels of comparisons of the food ingredient information with selected possibilities of matches in the database.

17. The computer-readable storage medium of claim 16, further comprising instructions when executed are operable to order results of the cascading series of searches by confidence accuracy.

18. The computer-readable storage medium of claim 15, wherein the plurality of executable instructions are, when executed, further operable to:
send the nutrient content information to a client device;
receive corrective instructions from the client device, wherein the corrective instructions include instructions on modifying the nutrient content information; and
modifying the nutrient content information based on the corrective instructions.

19. The computer-readable storage medium of claim 15, wherein the database of known food ingredients comprises one or more lists of individual food items and respective nutritional values for each.

20. The computer-readable storage medium of claim 19, wherein the calculation of the nutrient content comprises a determination of a sum of a plurality of products of the nutritional value for each of the plurality of the known ingredients and the quantity associated therewith.

* * * * *